(No Model.) 5 Sheets—Sheet 1.

A. J. SHAW.
RHEOSTAT.

No. 535,027. Patented Mar. 5, 1895.

Fig. 1.

WITNESSES

ALTON J. SHAW
INVENTOR,
by Dodge Sons
Attorneys.

(No Model.)  5 Sheets—Sheet 2.

A. J. SHAW.
RHEOSTAT.

No. 535,027.  Patented Mar. 5, 1895.

Fig. 2.

WITNESSES
Geo Burdine
C. H. Bull.

ALTON J. SHAW
INVENTOR
by Dodge & Sons,
Attorneys.

(No Model.) 5 Sheets—Sheet 3.

A. J. SHAW.
RHEOSTAT.

No. 535,027. Patented Mar. 5, 1895.

WITNESSES
C. C. Burdine.
C. B. Bull.

INVENTOR:
ALTON J. SHAW,
by Dodge & Sons
Attorneys.

(No Model.) 5 Sheets—Sheet 4.
A. J. SHAW.
RHEOSTAT.

No. 535,027. Patented Mar. 5, 1895.

Attest:
C. C. Burdine
E. B. Bull

Inventor:
ALTON J. SHAW
by Dodge Sons,
Atty's.

(No Model.)  5 Sheets—Sheet 5.

A. J. SHAW.
RHEOSTAT.

No. 535,027.  Patented Mar. 5, 1895.

WITNESSES
Geo. Burdine
C. B. Bull

INVENTOR:
ALTON J. SHAW,
By Dodge & Son
Attorneys

UNITED STATES PATENT OFFICE.

ALTON J. SHAW, OF MUSKEGON, MICHIGAN, ASSIGNOR TO MARY H. SHAW, OF SAME PLACE.

RHEOSTAT.

SPECIFICATION forming part of Letters Patent No. 535,027, dated March 5, 1895.

Application filed December 1, 1894. Serial No. 530,587. (No model.)

*To all whom it may concern:*

Be it known that I, ALTON J. SHAW, a citizen of the United States, residing at Muskegon, in the county of Muskegon and State of Michigan, have invented certain new and useful Improvements in Rheostats, of which the following is a specification.

My invention relates to a combined reversing switch and rheostat, and consists in various novel features, combinations and details hereinafter set forth, and illustrated in the accompanying drawings, wherein—

The present invention is designed to supply a much needed apparatus for the control of electric motive machinery of all kinds, but particularly electric railway cars or vehicles, and electric cranes and hoisting machinery.

Practical experience has shown it to be important that a current controller for such uses should possess the following characteristics: compactness and durability; maximum radiating surface within given space; freedom from liability of grounding or short-circuiting; ready accessibility of parts, with ease of removal and replacement; immunity from dangerous or injurious sparking when opening or breaking the circuit, together with simplicity of construction and ease and uniformity of action and result. These various desirable qualities are possessed in an eminent degree by the structure illustrated in the drawings, by the aid of which the invention will now be explained in detail.

Figure 1:
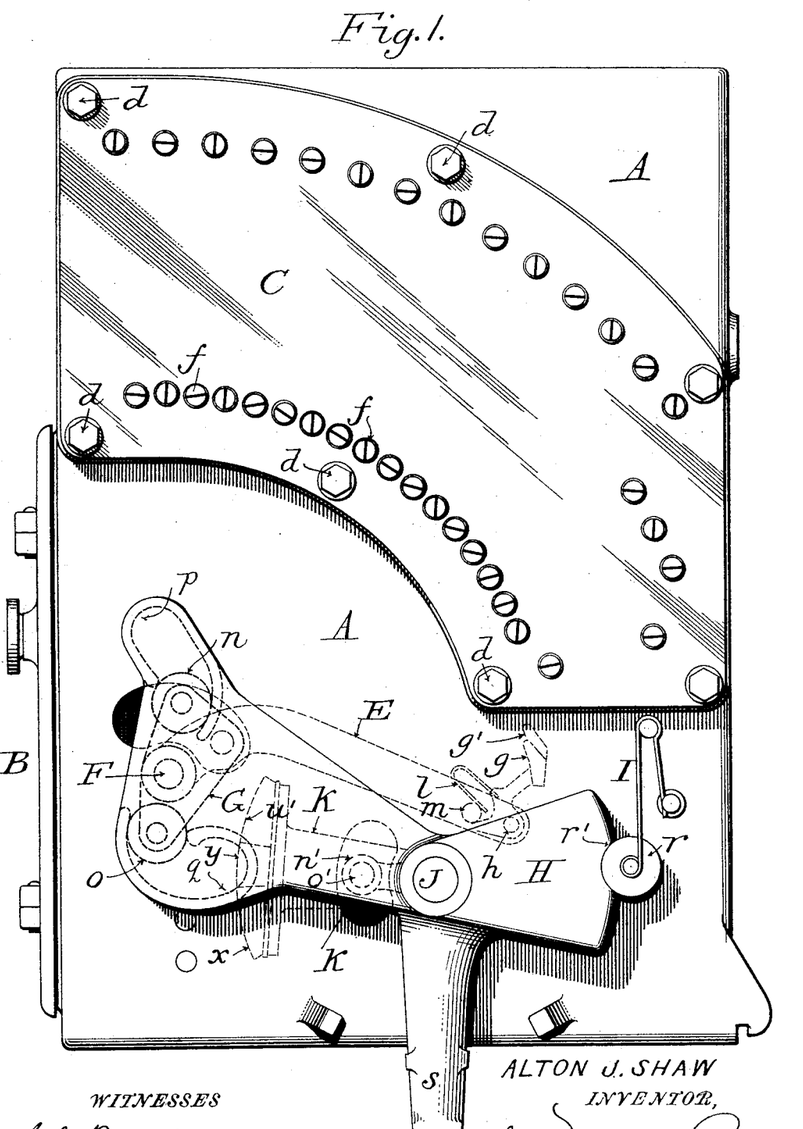
Figure 1 is a side elevation of a rheostat constructed in accordance with my invention.

A indicates a box, shell or casing, which may advantageously be made of cast iron, though other material may be used. This casing is provided with openings $a$ of segmental shape, in its side walls, with an elongated opening $b$ in one side wall below the opening $a$, and with a fourth opening $c$, in its front wall, the latter being provided with a door or closure B, as shown in Fig. 1. In addition to these main openings there are others formed in the top, bottom and rear walls, which are intended to permit free circulation of air through the shell, and are therefore allowed to remain permanently open.

As heated air naturally rises, the advantage of having openings at the top and bottom of the casing A will be apparent.

Figures 3, 15, 16:
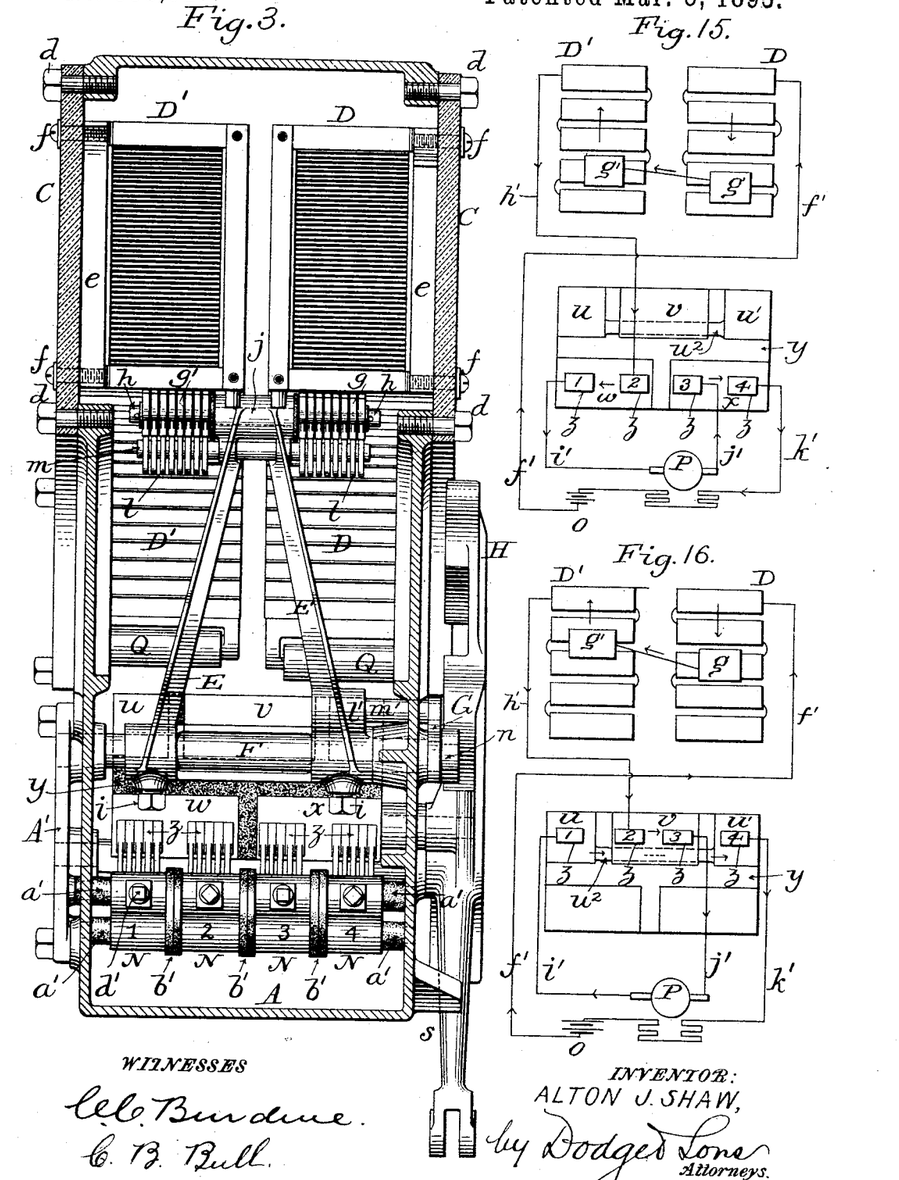
Fig. 3, a view taken at right angles to the preceding, or looking into the structure from the left of Figs. 1 and 2, the casing being broken away for that purpose.
Figs. 15 and 16, diagrammatic views illustrating the paths of the current under different adjustments of the controlling lever.

C C indicate two slabs or plates of insulating or non-conducting material, such as slate, glass, vulcanized fiber or the like, of a shape preferably corresponding to that of the openings $a$, and of dimensions somewhat greater than said openings. They are designed to carry the resistance blocks, cards, or sections D and D', which are arranged in two independent groups as shown in Fig. 3, each slab carrying one group.

The slabs or plates C C being larger than the openings $a$, overlap the boundaries of the latter, and are made fast to the shell or casing A by means of tap bolts $d$ or equivalent fastenings, which may be readily withdrawn to release and permit the removal of the slabs.

By arranging the resistances in two parallel groups as shown, I am enabled to place a large resistance within small compass, and I attain other important results which will presently appear.

The resistance blocks, cards or sections may vary in form and construction, though I prefer the design represented in the drawings and hereinafter more fully explained. For the present it is sufficient to say that each section D and D' is provided with a metallic frame $e$, which is tapped to receive bolts or screws $f$, by which the frames or sections are made fast to the slabs or plates C C, which latter insulate the frames from one another and form the shell or casing. One face of each frame $e$ constitutes a contact block or surface.

It will be seen from what has been said that by merely withdrawing the bolts $d$, either slab or both slabs may readily be detached from the shell or casing A, each carrying with it one complete group of resistances. It will further be seen that by withdrawing the screws $f$ of any one of the resistance cards or sections, and disconnecting said section from those adjoining, it may be removed from the slab or plate C for examination, repair or renewal In this way the parts most liable to injury are rendered readily accessible from the outside of the shell, which is a matter of prime importance.

The resistance blocks or sections of both groups D D' are placed in radial relation to and equidistant from the axis of a movable arm or lever E, which carries contact fingers $g$ $g'$, by which electrical contact is made with the resistance blocks, cards or sections.

Figure 2:
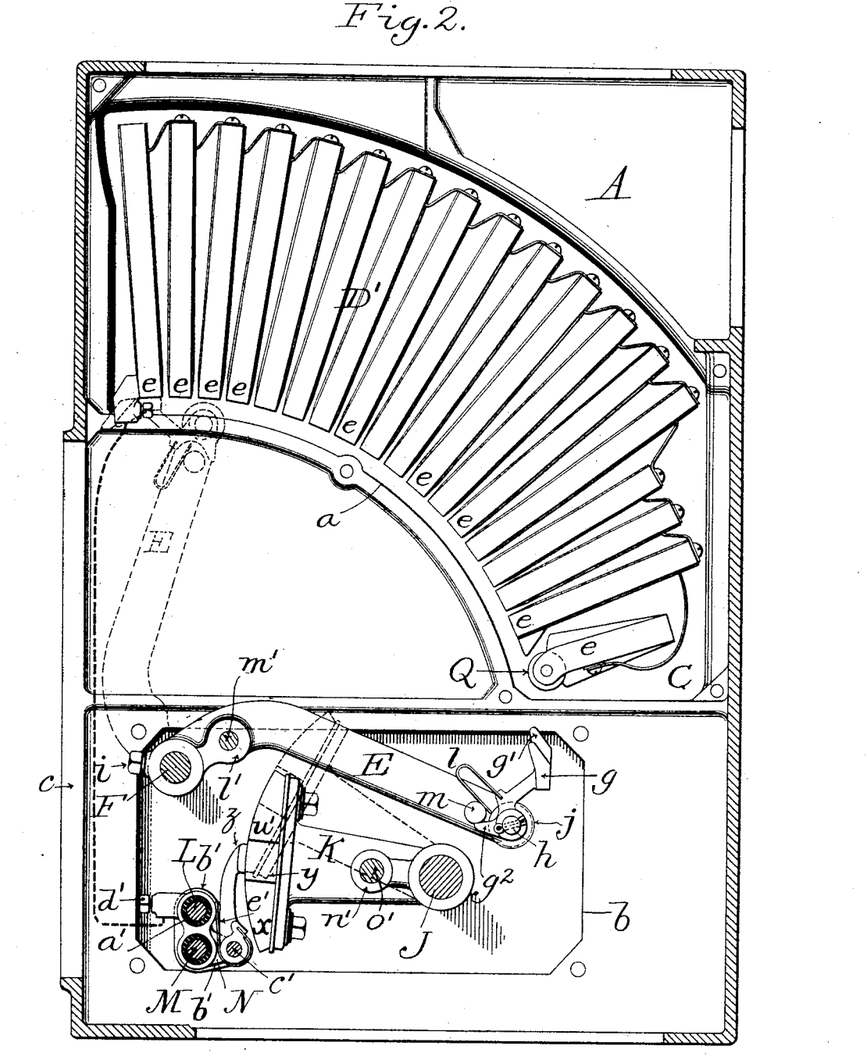
Fig. 2, a vertical central section through the same.

The current from the generator or source of supply enters the resistance card or section at the extreme left or upper end of one group, as viewed in Fig. 2, and passes thence through all the resistances of that group until it reaches one with which the fingers $g$ are in electrical contact. It passes thence through a conducting pivot rod $h$ on which said fingers are carried, to the remaining fingers $g'$, which being in electrical contact with a block or card of the second series, affords a path for the current to and through the cards or sections from the point of such contact back to the extreme left of such second series. It will thus be seen that whenever any current is passing, the resistance blocks or sections at the left which occupy a vertical or nearly vertical position, are included in the circuit, and that when the fingers $g$ $g'$ make contact with the block at the right of each group, still considered with reference to Fig. 3, the total resistance will be included in the circuit. From this it follows that the cards or sections at the left are most in use and carry the heaviest currents, hence are much more liable to heat than are the others. It is for this reason that said sections are placed in a nearly vertical position, since in that position they offer but slight obstruction to air currents, which, occasioned by the heat of the sections and following the well known law, pass upward through the shell or casing A, which acts to some extent as a flue or chimney.

The cards or sections are separated sufficiently to permit the air to circulate freely between them, and they are so constructed as to permit the air also to pass through them. Hence even those sections which approach more nearly to a horizontal position are well ventilated and freely part with any heat generated in them.

The separation of the blocks or sections is sufficient to preclude short-circuiting of the current by leaping from one section to another, and the firmness of their attachment to the slabs or plates C renders accidental displacement and contact entirely improbable.

Figures 7, 8, 9, 10, 11, 12, 13, 14:
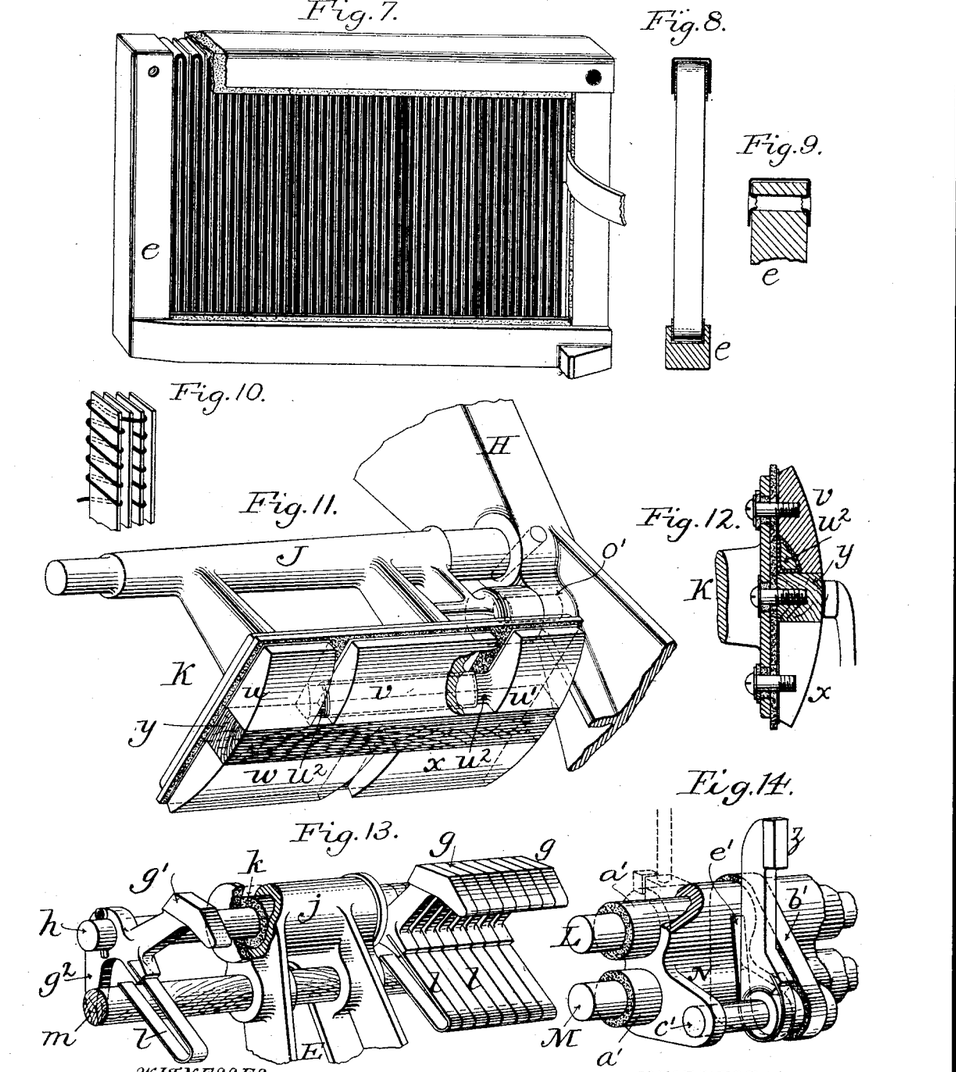
Figs. 7, 8, 9 and 10, views illustrating the preferred construction of the resistance cards or sections.
Figs. 11, 12, 13 and 14, detail views of various parts hereinafter described.

The construction and arrangement of the contact fingers $g$ $g'$ and their carrying-lever E is illustrated in Figs. 2, 3, and 13, upon referring to which it will be seen that the lever E is a substantial bifurcated member, made fast upon a rock shaft F by means of set screws $i$, or other fastenings, set screws being preferred because permitting of proper adjustment of the lever relatively to other parts carried by said shaft.

The lever E is formed with a tubular barrel $j$ at its outer or free end, as best seen in Fig. 13, within which barrel is a sleeve or lining $k$, of vulcanized fiber, gutta percha, or other good insulating material. Passing through the lining $k$ and by it insulated from the lever E, is the rod $h$ previously mentioned, which is advisably made of copper, though brass, iron or other good electrical conductor may be used.

The rod $h$, as before mentioned, carries the contact fingers $g$ $g'$, which are made of brass, copper, or other good conducting material, and are perforated and slipped upon the rod from its ends, being there retained by washers and split pins or keys, or in any equivalent manner. The fingers fit somewhat loosely upon the rod $h$, and are therefore quite free to turn or rock thereon, within limits prescribed by other parts. Each finger is of the form shown in Figs. 2, 3 and 13, that is to say it comprises a contact head, beveled at the forward end, a shank, enlarged to afford room for the opening through which rod $h$ passes, and a tail or projection $g^2$, and in addition each is furnished with a spring $l$ designed to press the finger against the contact surfaces of the resistance blocks or sections. In the drawings I have shown a bent or folded spring $l$, one extremity of which is inserted in a slot formed in the shank or body of the contact finger, and retained by compression of the metal upon it, but any other suitable form and any ordinary mode of attachment may be adopted.

Passing through or otherwise carried by lever E, parallel with and a short distance from rod $h$, is a second rod or bar $m$ which is formed of wood, gutta-percha, vulcanized fiber, or any suitable non-conducting material, its office being to afford a bearing or support for the free ends of springs $l$. It is obvious that a metallic rod properly insulated from lever E, or covered by a sleeve or shell of insulating material might be used, but a wooden rod is found quite satisfactory.

In the practical use of a structure of this kind, it is desirable that the actuating or controlling lever stands at a given point when no current is passing, and that it be movable therefrom in one direction to cause a forward rotation of the armature and in a different direction to cause rotation of the armature in the reverse direction. It is peculiarly advantageous so to construct and arrange the parts that a movement of the controlling lever forward from its normal position shall result in forward rotation of the armature, or in forward travel of the vehicle or structure moved, the current increasing with the amplitude of movement of the lever, and that a movement of the lever backward from its normal or medial position shall result in backward rotation of the armature, or backward movement of the structure, the current increasing with the increasing range of outward or backward movement. The reason why this arrangement is so desirable is that it indicates by the direction of movement the result that will follow, and is a natural and certain guide to the operator or attendant. It is peculiarly important where a series of levers is employed, as in modern electric cranes, because it lessens the mental strain upon the operator involved in keeping in mind the direction of movement of each lever necessary to a given or desired action or result. I have therefore devised mechanism whereby the lever may be caused to carry the fingers $g$ from the non-contacting position at the extreme right of the resistance cards or sections, indicated in Fig. 2, to and over the various contact surfaces of said sections by an outward movement of the operating or controlling lever either way from the normal or medial position, and to return them to their non-contacting position by returning the operating lever to its normal or medial position. In connection with the mechanism by which this result is effected I employ a rocking contact surface which, acting in conjunction with a second set of spring fingers, reverses the direction of flow of current through either the armature of the motor or through the field thereof, but not through both.

I will first explain the mechanism by which the arm E is actuated, for which purpose reference is made to Figs. 1 to 5 inclusive. As shown in Fig. 3, the rock shaft F which carries the arm or lever E, is journaled at one end in the main shell or casing A, and at the other end in a plate A' secured thereto by tap-bolts or equivalent fastenings. One end of said rock shaft protrudes beyond the outer face of the wall of shell A, and is furnished with a double-ended lever G, provided at opposite ends with rollers $n$ and $o$, which are carried by studs projecting laterally from the outer face of said lever G, as shown in Figs. 3, 4, 5 and 6.

H indicates a driver, which is represented as a three-armed casting, one arm of which has curved or cam-shaped recesses or guides $p$ and $q$ formed in its inner face to receive alternately the rollers $n$ and $o$.

Figures 4, 5, 6:
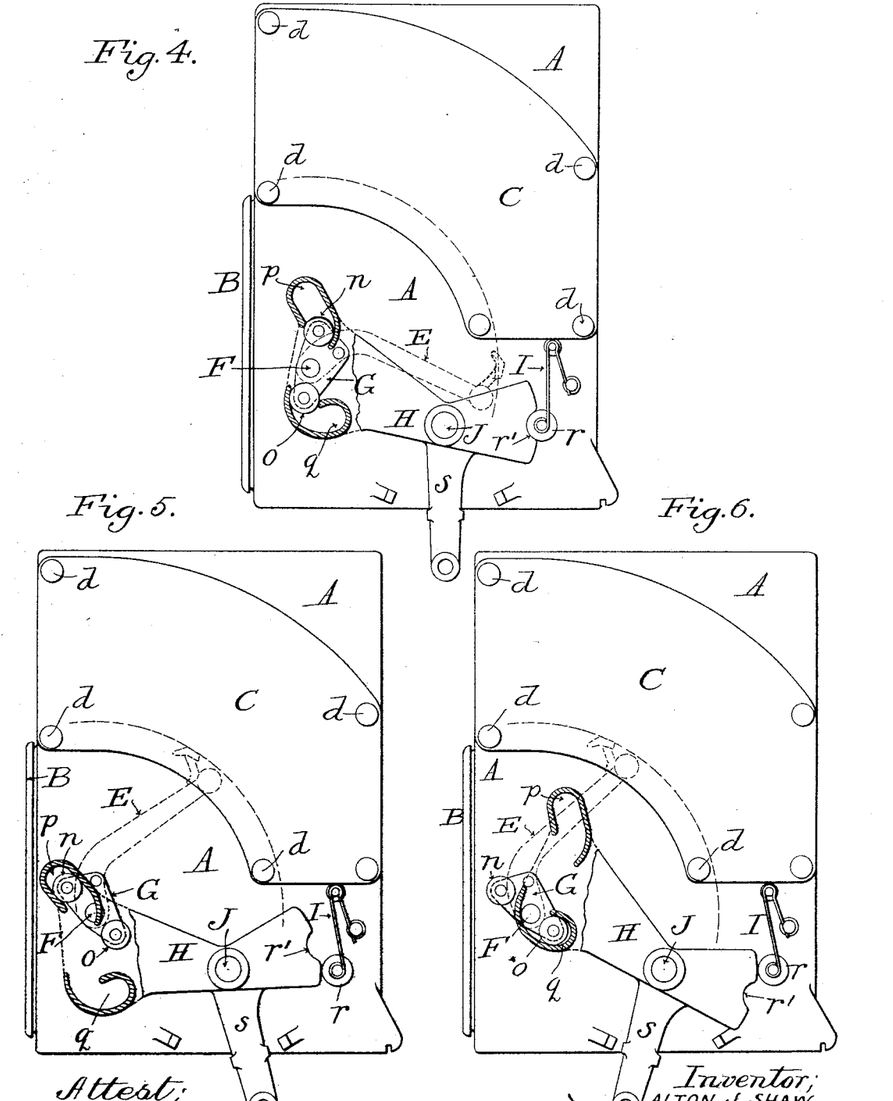
Figs. 4, 5, and 6, side elevations, partly broken away or sectional to show the mechanism for effecting movement of the contact brushes over the resistance blocks or sections.

In Figs. 4, 5 and 6 the body of the driver H is broken away to enable the rollers to be seen in their proper relations to the recesses or guides $p$ $q$. A second arm of the driver acts primarily as a counterbalance for the arm containing the recesses, but it has a notch or depression $r'$ formed in its end face to receive a roller $r$ carried by a stout spring I, whereby the driver H is held normally in the position shown in Fig. 4. The third arm $s$ of the driver constitutes a lever by which to rock it upon or with its supporting shaft J, which latter is journaled in frame A and plate A', in the same manner as is shaft F. The arm $s$ may itself constitute a hand lever by which to actuate the driver, or as is preferred, it may be connected by a rod or bar with a hand lever located at any convenient point. Its throw is limited by suitable stops on the shell or casing A, as shown in Figs. 1, 3, 4, 5 and 6. When the driver is in its medial or normal position as represented in Figs. 1 and 4, the rollers $n$ and $o$ stand at the mouths or open ends of the recesses or guides $p$ and $q$, as indicated. By moving the arm $s$ to the right, or in other words by causing the operative end of driver H to descend, roller $n$ is acted upon by the upper wall of guide or recess $p$, and throws the upper end of lever G downward to the left, thereby causing shaft F to rock to the left and to carry with it the arm or lever E. The initial movement of arm or lever E carries the fingers $g$ $g'$ into contact with the lowermost or right hand contacts of the two series of resistances, which causes the current to traverse the total resistance; but as the driver H continues its movement, the fingers $g$ $g'$ are caused to move toward the left over the resistance contacts, until, if so desired, only the frames of the extreme left hand pair of cards or sections will be in circuit, and the maximum current will pass. The current may of course be varied between these extremes in accordance with the extent of movement imparted to the driver.

A return movement of the driver H reverses the travel of arm or lever E and fingers $g$, introducing more and more resistance and lessening the current, until just before the driver reaches its medial or normal position, the fingers $g'$ break contact with the first or right hand contacts of the series and totally interrupt the current. Similarly, a movement of the arm $s$ to the left, or an upward movement of the operative arm of driver H carries the lower wall of guide or recess $q$ against roller $o$ and moves said roller upward to the right, which is the same in effect as carrying roller $n$ downward to the left—that is to say, whether the roller $n$ be depressed or the roller $o$ be elevated, the shaft F and arm E are moved to the left, but while the result is the same in both cases, it is brought about by a movement of the driver in opposite directions from its normal position.

It will be observed that the guides $p$ and $q$ are formed by walls projecting from the face of driver H, and that an open space is left between the walls of one and the other guide. This space permits the roller which at the time is not being acted upon to swing out of line with the guide which is then operating upon the other roll, as will be seen upon referring to Figs. 5 and 6. It will be seen upon referring to Figs. 4, 5 and 6 that I secure by this contrivance a very long sweep of arm E and fingers $g$ for a relatively short throw of driver H, and by properly shaping the guides $p$ and $q$, the throw of arm E relatively to the movement of driver H or of its actuating lever is made practically uniform throughout. This uniformity of relative movement is of great importance in controlling electrical machinery, since it enables the attendant to judge with certainty the increase or decrease that will result from a given movement of the actuating lever. It is therefore not only distinguishable from a heart-cam, a single roller and cam, and other contrivances of the sort, but is much superior thereto for the purposes set forth. In order to reverse the motor controlled by this device, it is of course necessary to introduce some means by which the direction of the current to the field or to the armature shall be changed according as the controlling lever is moved only at the right hand side of its medial or normal position or only at the left hand side thereof. Such means are illustrated in Figs. 2, 11, 12 and 14, Fig. 2 showing the parts in operative relation and Figs. 11, 12 and 14 illustrating the details of their construction.

K indicates a rocker frame carried by the shaft J which carries the driver H. It consists of a flat plate sustained by arms projecting radially from rock shaft J, and carrying contact blocks $u, u', v, w$, and $x$, the blocks $u$ and $u'$ being electrically connected with each other, but all insulated from the rocker frame K and from each other with the exception of blocks $u$ and $u'$ noted. Connection is established between the blocks $u$ and $u'$ by a bar $u^2$ integral with them, which runs beneath or back of block $v$ and is wrapped with mica or other insulating material. The ends and sides of the blocks proper are separated by such open spaces or by such insulating material as will preclude the possibility of short circuiting from one to the other, it being preferred to depend upon air spaces between their ends and to place a wooden, hard rubber or vulcanized fiber bar or strip $y$ between their side faces or between the two groups comprising respectively blocks $u, u'$ and $v$, and blocks $w$ and $x$. The central non-conducting bar $y$ is made flush with the blocks $u, u', v, w$, and $x$, and the surface thus produced is curved concentrically with the axis of rock shaft J and rocker K, as shown in Figs. 2 and 11. Electrical contact is made with the blocks $u, u'$ and $v$, or with blocks $w$ and $x$, by means of elastic or spring-pressed fingers $z$ arranged in four groups, as shown in Fig. 3, each group completely insulated from the others and from the shell or casing A.

The manner of mounting and insulating the fingers $z$ may be varied without affecting the action of the apparatus, but I prefer the plan illustrated in Figs. 2, 3 and 14.

L and M indicate two metallic rods, which extend across the shell or casing A parallel with shafts F and J, their ends being seated in the walls and in plate A' of the shell as shown. Each rod is encircled by a sleeve $a'$ of vulcanized fiber, hard rubber, or equivalent insulating material extending from wall to wall of shell A. Upon this sleeve are placed or strung four hanger frames N, which in turn are insulated from one another by plates $b'$ of insulating material. Each hanger is formed with two projecting arms in and between which is supported a short rod $c'$, constituting a pivot for one of the four groups of fingers $z$. Each hanger is formed with a socket to receive a conducting wire and furnished with a binding screw $d'$, and space enough is left between the outermost ends of the hangers and the shell A to preclude short circuiting from one to the other; or insulating collars may be placed between the hangers and shell A. As shown in Figs. 2 and 14, each finger $z$ is furnished with a spring $e'$, by which its free end is pressed toward the rocker K, and held in contact with the blocks thereon, or, when the parts are in normal or medial adjustment, each is held against the non-conducting bar or strip $y$. Being carried by or cast integral with rock shaft J the rocker K moves in unison and in the same direction with said shaft, and with the driver H secured thereon. Hence, as with the parts in normal or medial adjustment the bar $y$ of the rocker is opposite and in contact with the fingers $z$, a downward movement of the effective end of driver H will cause the rocker to descend and carry the blocks $u, u'$, and $v$ opposite to and into contact with the fingers $z$, but an upward movement of the effective end of rocker H will cause the rocker to rise and carry the blocks $w$ and $x$ opposite to and into contact with the fingers $z$. The results of these changes of contact may best be explained in connection with the diagrammatic views, Figs. 15 and 16.

O indicates a source of electric energy or supply which will ordinarily be a dynamo-electric generator, but may be a battery, either primary or secondary, or such other source of supply as may be conveniently accessible. From one terminal of this supply a conductor $f'$ is led to the last or uppermost resistance card or section of group or series D, passing thence through this resistance and any others that may intervene between it and the contact fingers $g$ carried by lever E. From the fingers $g$ the current passes by their pivot rod $h$ to fingers $g'$, thence to and through the resistance block or section of series or group D' upon which said fingers rest, thence through any others intervening between that one and the end of said series, whence it is led by a conductor $h'$ to group No. 2 of the fingers $z$ of the reversing rocker K. Assuming said fingers to be resting upon conducting block $w$ as in Fig. 15 by reason of an upward movement of the driver H and rocker K, the current passes by said block to group No. 1 of the fingers $z$, whence a conductor $i'$ leads to one commutator brush of the motor P, here represented as the left hand brush.

After traversing the armature-winding, the current leaves by the second or right hand brush and passes by a conductor $j'$ to group No. 3 of the fingers $z$ and through block $x$ upon which they rest, to group No. 4 also resting thereon. From the group No. 4 the current passes by a conductor $k'$ to the field-winding of the motor P, and thence to the second terminal of the generator or source of supply O, thus completing the circuit.

Assuming now that the driver H be moved to depress its effective end and to carry the rocker K down to its lower position, as indicated in Fig. 16, causing contact of the blocks $u, u'$ and $v$ with the fingers $z$, the current will pass from the generator O to and through resistance blocks of group or series D, to and through fingers $g$ and $g'$ and resistance blocks of group D', and by conductor $h'$ back to group No. 2 of fingers $z$, as before, thence by block $v$ to group No. 3 of said fingers, passing from said group No. 3 to the right hand commutator brush of motor P, through the armature winding to the left hand brush, thence to group No. 1 of fingers $z$, thence to block $u$ and its connected block $u'$, or in a direction opposite to that previously followed. The fingers $z$ of group No. 4 rest upon block $u'$ and the current consequently goes by said fingers to the field coils of motor P and thence back to the generator in the same direction as before. By this arrangement the current is caused to travel always in one direction through the motor field, but in one or another direction through the armature windings according to the direction in which the operating lever or the driver is moved from its medial or normal position.

It is customary to secure crank arms, levers and like parts to their shafts by means of keys or set screws; but in the present instance I have avoided use of such fastenings in all important places, and this for several reasons. Set screws are not thoroughly reliable and safe, but are liable to permit slip or displacement. They also permit inexperienced persons to vary or modify the adjustment of parts, which in a structure of this sort is fraught with danger.

Keys or feathers are necessarily located so close to the center that the slightest lost motion, or a very minute error in location will result in a quite material change in the angular position of the free or outer end of the carried part, relatively to the shaft, so great in fact that it would be well nigh impossible, and certainly impracticable, to make the parts interchangeable through the use of ordinary shop appliances. To avoid these difficulties I employ what may be termed "driving pins" or "transmitting pins," since their office is to impart or transmit motion from one part to another. These pins being placed at a relatively considerable distance from the center or axis of the shaft, are free from the objections noted, and they possess the further advantage, of marked importance in the present instance, that the parts may readily be separated or disassembled and reassembled.

As shown in Figs. 2 and 3, the arm or lever E is formed with a boss $l'$, which is drilled to receive a stout pin $m'$, which, projecting through an elongated opening in the shell or casing A, enters a hole or socket in the double-ended lever G carried by the shaft F, which shaft also carries arm E. In like manner reversing-rocker frame K is formed with a boss $n'$ which is drilled to receive a driving pin $o'$, which projects through an elongated opening in shell A and enters a hole or socket in the driver H.

The driver H is secured upon the end of shaft J by a through pin or otherwise; but the hole for said pin is drilled and the pin is inserted after the parts are assembled, so that there may be no disturbance of the adjustment, determined by the driving or transmitting pin $m'$. The lever G being beneath the driver, or between it and shell or casing A, cannot work off the end of shaft F, even were there any tendency for it to do so.

The resistance cards or sections may be of any approved construction, many forms being now well known; but I prefer to employ sections of the type illustrated in Figs. 7, 8, 9 and 10, which however, are not specifically claimed herein but will be embodied in a separate application. So far as necessary to a full understanding of the present case, they may be said to consist of an internally channeled metal frame $e$, within which is held a strip of hoop iron, or other metallic band or tape, folded back and forth, the folds being insulated from each other and from the frame by interposed strips of mica or equivalent material.

Where the conductor is designed to carry a smaller quantity of current, the flat tape or band may be replaced by wire, wound about the mica or other non-conducting strips, as in Fig. 10, in which case there should be additional strips of insulating material between the wire sections, as shown. Each section has its metallic conductor connected at one end to the frame $e$ of that section, and at the other end to the frame of the proximate section, as indicated in Figs. 2, 15 and 16.

Whatever be the form or character of the resistance cards or sections, it is desirable that they be introduced into or cut out of circuit one by one, in order that the increase or decrease of current may be gradual and capable of nice regulation, and that sparking be rendered as slight as practicable. To accomplish this result I place one group of fingers $g$ $g'$ in advance of the other, a distance approximately equal to one-half the distance between the contact blocks, which are here formed by the ends of the frames $e$. The arrangement will be readily understood upon referring to Figs. 15 and 16, from which it will be seen that the fingers $g$ and $g'$ will bring the resistances D and D' into circuit alternately; that is to say, will add first one of one series and then one of the other series, and so throughout the two groups. Similarly, the sections will be cut out alternately. The same effect may be secured by offsetting the resistance blocks or their contacts, so that those of one group or series shall alternate with those of the other, or that each block in one series shall come directly opposite the space between two blocks of the second series.

In rheostats, switches and the like, wherein the current is frequently completely interrupted or the circuit is broken, more or less sparking at the point of interruption is inevitable, and begets roughness of the parts between which the spark occurs. It is important to reduce the sparking to a minimum, as otherwise the roughness of the parts not only interferes with the ease and freedom of relative movements, but it also impairs the thoroughness or sufficiency of contact, increases resistance beyond that originally calculated, and is liable to occasion sparking even while the parts are in such imperfect contact.

To reduce the sparking, and to overcome the difficulties noted, I make the contact block or surface of the first or lowermost section of both series of resistances D and D' in the form of a loose roller Q, and I make the contact fingers $g$ and $g'$ in the form shown in Figs. 2 and 13, that is to say with two outer or bearing faces at an angle to each other. The result of this construction will be readily perceived upon reference to Figs. 2 and 4. When the arm or lever E stands in its normal position, as in Fig. 2, the fingers $g\ g'$ being free, are thrown outward by their springs $l$ until the tails $g^2$ rest against the rod $m$. When the arm is moved forward, the forward or beveled faces of the fingers $g\ g'$ first make contact with the rollers Q, and whatever sparking there may be either in approaching or in leaving the rollers will be between said rollers and the forward or beveled faces of the fingers. As the fingers ride upon and over the rollers, the latter are caused to turn, thus greatly facilitating the riding of the fingers onto the rollers and thence to the contact faces of frames $e$ of the resistance cards or sections. By this substitution of rolling for rubbing friction with the initial sections of the series, I render the action so free that I am enabled to use quite stiff springs to press and hold the fingers in contact with the resistance blocks or sections without necessitating undue power to start the lever or arm E. As the fingers move forward, their beveled faces are forced inward and the flat outer faces come into contact with the rollers and then with the contact faces $e$ of the resistance blocks or sections, the faces of the fingers being sufficiently long to enable them to bridge the space between the roller and the proximate surface $e$. It will thus be seen that the sliding contact of the fingers with the surfaces $e$ is made by faces that are not in any way affected by such sparking as may occur in making or breaking the initial contact.

When the arm E is moved backward and the fingers $g\ g'$ ride off the rollers Q, the springs $l$ swing the fingers about the pivot rod $h$, causing their beveled or forward faces to ride rapidly over the rollers and to impart a rapid rotation or spinning thereto, which is found greatly to lessen the spark. I thus secure not only the advantages of a snap-switch, but the added benefit of spinning the rollers, which latter is very marked on account of distributing the spark over a considerable area, viz: the entire circumference of the roll instead of concentrating it at a single point as would be the case with a fixed initial contact.

From the foregoing description and explanation it will be seen that access may at all times be had to the interior of shell A and to the contained working parts; that no internal machining of casing A is required; that by removing the tap bolts $d$ either slab C with its attached resistances can be quickly removed; that by withdrawing two screws, each resistance card or section in turn may be detached from the slab C; that by removing the tap bolts of plate A' it may be detached, and the reversing rocker K, the arm or lever E, the fingers $z$ and their supports thus be made free to be withdrawn from the shell or casing; and that all these parts are accessible and removable from the outside, or through external fastenings. Finally, the driver H can be detached by merely driving out its fastening pin. The propelling or driving pins $m'$ and $o'$ permit the ready withdrawal and replacement of arm or lever E and rocker K. The importance of these features is very great, as are the uniformity and ease of movement of the contacting fingers and reversing rocker.

By the peculiar arrangement of the resistances and contact fingers, I secure a wide range of variation, and a very gradual change, with comparatively slight movement of parts, and in a very compact structure.

It is to be understood that the invention is wholly independent of the form or character of the resistance cards or sections, and that those shown are merely illustrative.

The precise form and character of insulator are immaterial and various of the features herein described may be adopted without regard to others. Hence I wish it distinctly understood that such features are claimed *per se* and apart from their combination with or relation to others. Such modifications of form or construction as may be suggested by the skill of the mechanic, or by the conditions of particular situations, may of course be made without departing from the spirit and scope of my invention. Thus the rollers $n$ and $o$ may be dispensed with and bare studs be used; the grooves or guides may be formed in the double-ended lever G and the studs or rollers be carried by the driver, and like variations may be made.

A prominent feature of the invention is the means for imparting motion to the arm E, concerning which it is to be particularly observed that a quite restricted angular movement of the driver produces a vastly greater angular movement of the rock shaft F and the parts carried thereby.

Another feature of importance is the fact that the contact surfaces over which the fingers travel are of a substance having a fusion point materially different from that of the fingers themselves, the frames of the resistance blocks, which frames constitute the contact surfaces, being here made of cast iron, while the contact fingers are of brass or copper. The effect of this combination is that there is no reasonable probability of the two metals fusing together, as often happens where they have the same or nearly the same fusion point.

Having thus described my invention, what I claim is—

1. In combination with shell or casing A provided with opening $a$; a plate or cover B of non-conducting material secured to the shell or casing by external fastenings; a series of resistance blocks or sections carried by the plate B and extending into the interior of the shell or casing, and fastening screws passing through the plate and into the frames of the respective resistance blocks or sections, substantially as set forth, whereby the plates are adapted to be detached from the shell or casing and the resistance blocks are adapted to be detached from the plates.

2. In a rheostat, a shell or casing A, cast in one integral body and having opening $b$ in its wall; a series of resistances located within the shell; a movable arm or lever also located within the shell and provided with fingers to make electrical contact with the resistances; a supporting shaft for said arm or lever journaled at one end in the shell or casing; and a removable plate covering the opening $b$ of the casing and provided with a seat or bearing for the opposite end of said shaft.

3. In combination with a shell or casing and with resistance cards or sections inclosed within the same; a swinging arm or lever provided with fingers to make contact with said resistances; a current-reversing rocker; contact fingers adapted to bear upon said rocker; a driver or lever for actuating the swinging arm or lever and the rocker; shafts or rods for supporting the swinging arm, the rocker and the rocker-contact fingers, said shafts or rods being seated at one end in the shell or casing; and a removable plate applied to an opening in the shell or casing and provided with bearings or sockets for the opposite ends of the shafts, substantially as described and shown.

4. In combination with the two groups of resistances D and D′, contact fingers $g$ and $g'$ in electrical communication with each other and adapted to bridge the two groups of resistances, the fingers $g'$ being extended in advance of the fingers $g$, substantially as and for the purpose explained.

5. In a rheostat, the combination of two groups or series of resistances; a member movable relatively thereto and provided with a barrel $j$; a conducting rod $h$ carried by but insulated from said barrel; and two groups of fingers carried by said rod and serving to bridge or connect the two groups of resistances.

6. In combination with a series of resistances, a movable contact arm; a shaft therefor provided with a two-armed lever; studs or rollers projecting from said lever, one from each arm; and a driver for actuating the lever and its connected parts, said driver being provided with two guides or ways to receive the respective studs of the two-armed lever, substantially as set forth.

7. In combination with rock shaft F provided with double-ended lever G having projecting studs $n$ and $o$, a driver H provided with guides or ways $p$ and $q$ to receive said studs.

8. In combination with a shell or casing, a shaft journaled therein, and a part or member rigidly secured to said shaft; a second part also carried by said shaft, one of said parts being within and the other outside the casing; and a driving stud or pin extending from one of said parts through a slot in the casing and into a seat or socket in the other part; whereby the two are held in proper relation and are caused to move in unison.

9. In combination with a series of resistance cards or sections, a contact arm E provided with a laterally-projecting pin or stud $m'$; a shaft F for supporting said arm, and a lever mounted upon the end of the shaft and provided with a hole or socket to receive the pin $m'$.

10. In a combined rheostat and reversing switch, the combination of a series of resistances; a rock shaft F provided with a contact-making arm E; a double-ended lever G, carried by the rock shaft and provided with studs $n$ and $o$; a second rock shaft J; a rocker K carried by rock shaft J and provided with insulated conducting blocks $u$, $u'$, $v$, $w$ and $x$; a driver H carried by rock shaft J and provided with guides or ways $p$ and $q$; contact fingers $z$ adapted to bear upon the blocks of the rocker; and suitable connections between the fingers, the source of supply and the resistances, substantially as set forth.

11. In combination with rocker-frame K and its shaft J, an operating lever or driver H; and a propelling or driving pin $o'$ extending from the rocker frame to the driver and seated therein.

12. In combination with a series of resistances, a contact-making arm; an actuating-lever therefor adapted to stand normally at a medial point but free to move in either direction therefrom; and intermediate connections substantially such as described, between the contact arm and lever,—whereby a movement of the actuating lever outward and back in either direction from its medial position is caused to produce a movement of the contact arm forward and backward over the resistance always in the same path, and the extent of movement of the contact arm is made practically uniform for a given extent of movement of the actuating lever in any part of the path or travel of said lever.

13. In combination with a series of resistances, a rock shaft provided with a contact-making arm and with a two-armed lever; and a driver or actuating lever movable in opposite directions from its medial or normal position, provided with cam-ways, and serving to act upon one or the other arm of the two-armed lever and to move said lever always in the same direction and at a fixed rate relatively to given throw of the driver, when said driver is moved away from its normal position in either direction.

14. In combination with a series of resistances and with a contact-making arm therefor; a driver or actuating device for said arm; intermediate connections substantially such as shown and described, between the arm and the driver; and a detent for holding the driver in a medial position when the arm is in its normal or non-conducting position; whereby the parts are retained in proper normal position, and the movement of the driver away from its normal position in either direction is caused to carry the contact arm forward over the resistances, and the return of the driver to its normal position is caused to restore the contact arm to its non-contacting position.

15. In combination with a series of resistances, a movable arm or lever E provided with rods $h$ and $m$; contact fingers $g$ pivoted upon the rod $h$ and provided with tails $g^2$; and springs $l$ carried by the fingers and bearing upon the rod $m$, substantially as shown and described.

16. In combination with two series or groups of resistances as D D', a movable contact-making arm E, provided with conducting rod $h$, insulated from the arm E; and two series of fingers $g$ and $g'$ carried by the rod $h$ and serving with said rod to bridge or connect the two series or groups of resistances electrically.

17. In combination with two groups of resistances D and D', two groups of contact fingers $g$ and $g'$, and a conducting rod $h$ carrying both sets of fingers, the fingers of one group being extended in advance of those of the other group.

18. In combination with a relatively fixed contact, a movable contact finger having two bearing faces, the first to make initial contact and the other to make the subsequent or working contact.

19. In combination with a relatively fixed contact, a pivoted or yielding contact finger $g$ having its outer face beveled at the forward end, substantially as and for the purpose explained.

20. In a rheostat or like structure, the combination of a fixed conducting body adapted to be included in circuit, and provided with a rotatable contact, and a pivoted or yielding contact finger movable against or over said rotatable contact.

21. In a rheostat, switch or like structure, the combination of a rolling contact, and a second contact movable over said rolling contact substantially as set forth, whereby rubbing friction is eliminated, a large surface is provided over which to distribute wear, and the production of sparks is minimized.

22. The combination in a rheostat or like structure, of a rolling or rotatable contact, and a contact finger to coact therewith, provided with two contact surfaces, one at an angle to the other.

23. In combination with a series of contact blocks, the first of which is rounded substantially as shown, a yielding contact finger having its forward end cut away substantially as shown to enable it to ride over the initial contact and to bring another portion of its face in contact with the succeeding contact blocks.

24. In combination with a rolling contact Q and a series of fixed contacts following the same, a pivoted or yielding contact $g$ provided with two faces, one to make initial contact with the rolling contact and to ride upon the same, and the other to make rubbing contact with the fixed contacts, substantially as set forth.

25. In combination with a relatively fixed contact, a movable arm or lever provided with rods $h$ and $m$; a series of fingers $g$ pivotally mounted upon the rod $h$; and a series of springs, each carried by one of the fingers and serving to urge the same toward the fixed contact.

26. In combination with a movable reversing contact plate or rocker having blocks $u$, $u'$, $v$, $w$ and $x$ arranged substantially as shown; contact fingers $z$ arranged in groups; hangers N for supporting said fingers; rods L and M for sustaining said hangers; insulating sleeves $a'$ interposed between the rods and the hangers; and insulating plates $b'$ interposed between the respective hangers, substantially as described and shown.

27. In combination with rods L and M, hanger N, provided with pivot rod $c'$, fingers $z$ loosely hung upon said rod and provided with springs $e'$, substantially as shown.

28. In combination with a rock shaft as F, a driver H, and intermediate connections substantially such as described and shown, whereby a limited angular movement of the driver from its normal position is caused to produce a greater angular movement of the rock shaft.

29. In a switch or rheostat, the combination of contact blocks and contact fingers to co-act with said blocks, the said parts being formed of metals having materially different fusion points, whereby they are prevented from fusing together.

In witness whereof I hereunto set my hand in the presence of two witnesses.

ALTON J. SHAW.

Witnesses:
F. S. VROOMAN,
THOMAS C. AKIN.